United States Patent Office 3,178,992
Patented Apr. 20, 1965

3,178,992
RADIOMETER DISTINGUISHING AGAINST SPURIOUS SIGNALS
James L. Murphy, Old Greenwich, Conn., and Gerald Jankowitz, Lewisboro, N.Y., assignors to Barnes Engineering Company, Stamford, Conn., a corporation of Delaware
Filed July 25, 1960, Ser. No. 45,196
4 Claims. (Cl. 88—1)

This invention relates to radiometers and a method of using them to eliminate spurious signals.

Throughout this specification and claims the term "radiometer" is used in the broader sense in which it is frequently employed, namely an instrument which collects radiation and, impresses it on a detector which produces an electrical signal. In a great many cases this signal is used for measuring or similar purposes which is the reason for the terminology. However, the purpose for which the electrical signal is used often does not have any relation to the design of the radiometer. That is the case in the present invention where the electrical signals may be used for measurement, as error signals, for control of other equipment or for any other purpose for which electrical signals may be employed.

Radiometers are extensively used to measure radiation or to detect the movements of targets and for other purposes. Essentially the radiometer, of the class to which the present invention belongs, may be considered basically as comprising a radiation detector which transforms radiation into electrical signals, collecting optics imaging the objects of interest onto the detector and a radiation interrupter or chopper in the form of a device such as a reticle with a repetitive pattern of varying radiation transmission. The most common type of reticle is a disc with radial bars of various designs which constitute a pattern that repeats cycles of areas of different transparencies. In the simplest form of reticle these are alternate radial bars of opaque and transparent material, the latter sometimes being openings, these are usually referred to as bars and in the remainder of the present specifications for simplicity will be so designated it being understood, of course, that the pattern component may be of any desired shapes so long as the pattern accurately repeats.

Radiometers are useful with any radiation of sufficiently short wave lengths to obey optical laws accurately which will be referred to as optical radiations. This includes ultraviolet, visible or infrared the latter being the largest practical field of usefulness of radiometers. However, the invention is not limited to infrared instruments and is equally applicable to optical radiations of other wave lengths, of course, with suitable choice of optics and detectors or other elements for adequate response in the wave length band used.

Because of the periodic interruption of the radiation the electrical signal from the radiation detector is A.C. for any target the radiation from which is chopped or interrupted, A.C. amplifying and electronic processing circuits are of course used and do not respond to D.C. signals. The present invention employs the same type of the electronic circuits as has been used in the past and is, therefore, not concerned with any particular design of electronic circuits.

Many radiometers are used for relatively small and often faint targets, for example, moving aircraft, ships, rockets and the like. These targets are often viewed at a very considerable distance the total radiation from them may be very faint and may be only a minute fraction of the total radiation from a large background even when the target emits a different kind of radiation, for example in the case of infrared instruments the target is at a different temperature from the background, this radiation may be entirely swamped by the radiation coming from relatively large backgrounds. This constitutes a very serious problem in radiometers and has seriously restricted some of their fields of usefulness. It might be thought that if an extremely narrow field of view were used so that the target filled most of the field of view the problem would be solved. In spite of the theoretical attractiveness of this approach it is normally without practical utility because a minute field of view makes it impossible or impractical to find the small target and as the targets usually are moving this renders the minute field in view approach practically useless.

There have been several proposals advanced to discriminate in radiometers against uniform background. One of the most successful methods which have been used is to provide an aperture window in a mask on a reticle with entering and leaving edges broken up into segments, such as saw teeth, each segment extending over a whole number of pattern cycles and matched on the other edge by a corresponding segment. This solution, which is capable in effecting an enormous discrimination against uniform backgrounds up to a maximum of nearly a million fold is described and claimed in the copending application of Monty M. Merlen, Ser. No. 78,772, filed December 27, 1960. For completely uniform backgrounds such as a clear sky, a uniform expanse of water and the like, the Merlen reticle and mask combination has achieved spectacular practical success, however, it depends for its operation on a uniform background, if the background is not uniform, for example, sky with small clouds, radiation gradients and the like, the background radiation is not eliminated, and as a result a spurious signal is encountered.

Another type of background elimination is described and claimed in the copending application of Astheimer and Leftwich Ser. No. 269, filed January 4, 1960, now Patent No. 3,012,473. In this device there is provided a reticle with annular interrupting segments and a narrow line of discontinuity extending between them completely around the reticle. When combined with an accurately oriented aperture window, preferably movable radially with respect to the reticle, this instrument is also capable of very effective background elimination because if a uniform background is present, there is just as much energy on one side of the line of discontinuity as on the other and since the interrupting segments are arranged so that interruption is in a different phase on either side of the line of discontinuity these two phase 180° apart effectively cancel any signal from a uniform background. This device also is extremely effective but, as in the Merlen combination referred to further above, it also requires that the background be uniform over the reticle mask aperture or at least that it be uniform parallel to the radii of the reticle. Here again the instrument is not capable of rejecting a background which shows discontinuity.

The present invention solves in a satisfactory manner the problem of non-uniform background. It is particularly effective in the case of backgrounds where the non-uniformities are much smaller than the field of view of the instrument but are still somewhat larger than the target for which the radiometer is to be used. If the background remains reasonably stable over a short period of time during which the radiometer may be investigating a particular target it is even possible to discriminate against a non-uniform background where some at least of the non-uniformities are of substantially comparable size to the target.

While one of the most important advantages of the present invention is that it presents the possibility of discriminating against backgrounds which were hitherto beyond the capability of radiometers it should be understood that the instrument of the present invention is also capable of another function, namely of adjusting the characteristic of the radiometer and instruments incorporating it depending upon target sizes and positions. In this case the instrument is not operated in order to eliminate the background but, as will be brought out in detail below, the same mechanism permits adjusting the instrument for optimum results with a target at varying distances or positions in the aperture window. Since the same instrument is capable of performing either of these functions this incorporates an additional versatility and is a further advantage of the present invention.

Another advantage of the present invention is that the instrument may be controlled either manually or automatically, in the latter case using conventional electronic circuits and servo mechanisms. As has been pointed out above the invention is in no way concerned with the particular design of any electronic circuits or associated mechanisms, except, of course, that A.C amplifying circuits must be used, but the fact that with standard circuits and elements either manual or automatic adjustment is possible constitutes an additional advantage.

Essentially the purpose of this invention may be considered as a chopped radiometer with the elements of collecting objects, detector, and chopping reticle with its conventional window plus an additional element which cooperates with the others to bring about the new results of the present invention. This elment is means for varying the image size on the reticle. Its variation may be affected by changing the magnification of the optics or by varying the part of the reticle on which the image falls or both. The invention is capable of using any kind of optics, catoptric, dioptric, or catadioptric and the changing of its sizes may be affected by changing the position or optical power or elements in the optics, moving the reticle or both.

The invention will be described in greater detail in conjunction with the drawings in which.

Figure 1:
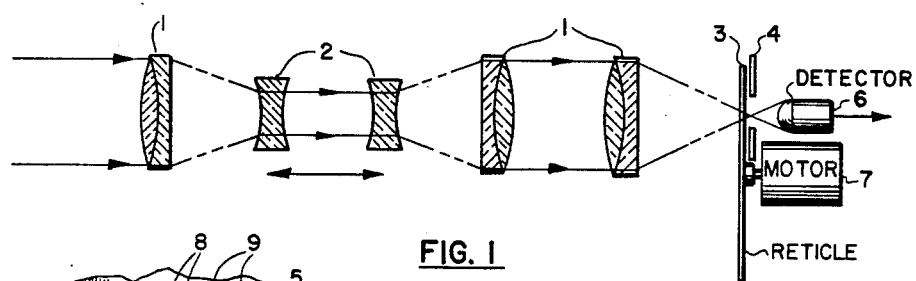
FIG. 1 is a diagrammatic illustration using a variable focus objective.

FIG. 1 shows an optical system of the varifocal type only the necessary elements being shown diagrammatically. The optics consist of three fixed lenses 1 and varifocus elements including two relatively movable lenses 2. The optical system images onto the plane of reticle 3 behind which is a mask 4 with a window 5 (see FIG. 2). After passing through the reticle and the window the radiation strikes a radiation detector 6. The reticle is conventionally driven by a synchronous motor 7.

Figure 2:
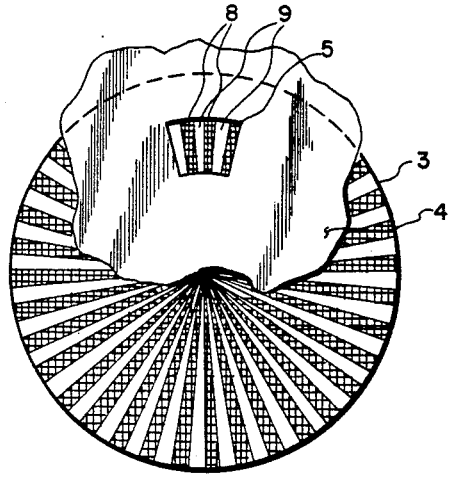
FIG. 2 is an enlarged detail plan view of a reticle and mask.

Turning to FIG. 2 it will be seen that the reticle is composed of radial bars 8 of opaque material interspersed with radial bars 9 of relatively transparent material. The latter may, and in the case of infrared instruments often will be, openings. In the reticle shown one pair of bars, 8 and 9, constitutes a pattern cycle. The illustrated reticle is of the simplest type, much more complex patterns being known. So long as the patterns are repetitive they are usable in the present invention which is, therefore, capable of using any known type of reticle of the repetitive pattern type. The radiation is interrupted or chopped at a predetermined frequency suitable for the time constant of the detector 6 and the latter produces an A.C. signal at chopping frequency which can then be processed in conventional A.C. amplifying and other electronic circuits (not shown).

Adjustment of the positions of the elements 2 in the varifocal system varies the focal length of the collecting optics but does not change the focal plane. In other words, the image of any target or components of a background on the reticle will change in size with change of magnification of the collecting optics but will still remain sharply in focus. The instrument is then pointed toward the background across which the target is expected to move. Assume for sake of illustration that the background is a sky with a number of small clouds which would be small enough to have their radiation chopped and which would, therefore, result in an A.C. signal from the detector 6. The elements 2 are then adjusted, increasing or decreasing the magnifications, until the image of the background becomes uniform as compared to the reticle pattern at which point there will either be no signal or normally a very small minimum signal. The adjustment of the elements 2 which changes magnification of the objects may be effected manually, in which case the operator adjusts to the zero or minimum reading of a meter or other indicator, or they may be automatically adjusted by using the electrical signal as an error signal to operate conventional servo mechanisims. As the present invention really ends when the signal is produced in the detector these conventional servo systems are not shown since their details form no part of the present invention. It should be noted that even when a background contains small discontinuities it is possible to find a magnification at which the overall background radiation is not chopped or chopped to produce a very low minimum signal.

The instrument is now calibrated and as a target moves past, for example an airplane, radiation from the target will be chopped and there will be a signal which gives the desired information from the target. Even though the target may be relatively faint the information will still be clear because there is so much discrimination against the background. It should be noted that in the case of the backgrounds having very small discontinuities the initial nulling of the instrument may not last long. However, the change in the characteristics of the background often is very slow compared to the time when a rapidly moving target is in the field of view, therefore, even in the extreme case of a background with small discontinuities the instrument calibration will last long enough to give a greatly improved response from the target.

The most extreme case has been described above, namely one in which the background has such small discontinuities that it is not possible to eliminate them entirely for any long period of time. The more common situation is represented by a background which has discontinuities that are much larger than the target, for example a sky with relatively small clouds, which clouds, however, are much larger than the target. In this case increase of magnification will increase the image size on the reticle to a point where clouds will extend over an exact number of bar pairs and, therefore, their radiation will not be chopped. A conventional sharp cutting filter in the electronic circuits can thus discriminate against any frequencies other than the maximum chopping frequency. Even if the cloud should change slightly in size or shape, a large part of the area will still remain cancelled so that even if the cancellation is not perfect, the amount of background energy being chopped is greatly reduced and, therefore, interference with target radiation will be that much less. The target, however, which is so small that it is chopped at maximum frequency will give its signal with undiminished energy. When it is desired to discriminate in the manner described, a relatively fine pattern of bars is needed and in most reticles the bars are indeed very narrow. This makes for a difficult representation in a small drawing and so in FIG. 2 the bar width is greatly exaggerated for clarity. It should be noted that where the problem is presented by relatively large background discontinuities such as, for example, clouds, the calibration which rejects them will last for a very much longer time.

As was pointed out above, the present invention is capable of performing another and different important function even with backgrounds which are completely uniform. This function may be illustrated by the problem presented by trackers for missiles, airplanes, and the like. In such a case the background can be eliminated by other means, for example, the so-called saw-toothed window edges of the Merlen application referred to above. But there remains the problem of finding the rapidly moving target and, once it is found, it is important to lock a tracker onto it and this requires a different type of information signal. The requirements may be simplified by stating that in order to acquire a target a relatively large field of view is necessary, in other words, a small image on the reticle for any particular point in the field of view. When the target has been found and the tracker has locked onto it in the conventional manner then it is important to keep the target exactly centered, and this is best accomplished by a very narrow field of view. In the case of most trackers which have been used there are multiple detectors or multiple reticle patterns. One is serving for acquisition and having a wide field of view and the other for following very closely without hunting a target which has already been centered.

In the case of the present invention, a single detector and mask can be used. For example, initially the optics would be set for a wide field of view which is normally represented by short focal length. The target appears, the standard servos receive a signal from the target and begin to center it. As soon as they receive a signal and start aiming the tracker, the focal length of the objective is slowly increased, increasing the size of the image and narrowing the field of view, until the tracker is aimed directly at the target at which point the field of view will be reduced to a minimum and accurate tracking takes place without the use of multiple detectors or special acquisition and following mechanisms. If the target suddenly moves and comes out of the narrow field of view, which might occur for example, when an airplane comes nearer the tracker and turns suddenly so that there is a much greater angular rate of movement, the target may come out of the field of view, no signal results and the optics are then adjusted to a shorter focal length and a much wider field of view, and so, the target is once more included. The important function of varying the field of view is thus performed. This is an advantageous versatility of the instrument permitting its use in an additional field. It should be noted that the present invention has nothing whatsoever to do with a tracker of any particular design. The invention deals with an adjustment of image size of targets on a reticle, and so, the detector. The description in terms of a tracker is merely for the purpose of illustrating one field in which the additional function of the invention may be performed.

Figure 3:
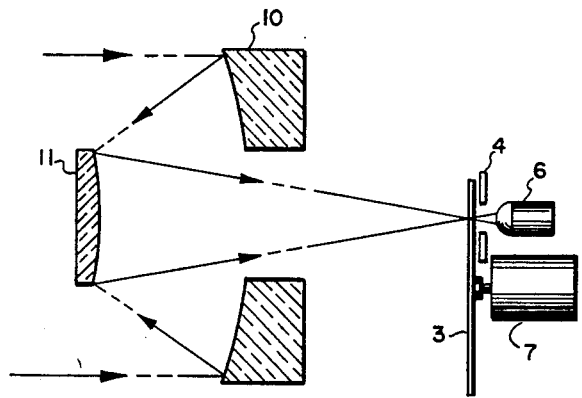
FIG. 3 is a diagrammatic showing of an all catoptric system.

FIG. 1 illustrates a conventional varifocal objective, the objects being all dioptric. In visible light and the near infrared and ultraviolet a very compact instrument is made possible. However, in the far infrared dioptric optics are often less advantageous and it is an advantage of the present invention that the optics may be catoptric. This presents the advantage of achromaticity over a very wide radiation band and optics of high speed for the use of the infrared can more easily be designed with mirrors. FIG. 3 illustrates such an instrument. Reticle, mask and detector are the same as in FIG. 1 bearing the same reference numerals, however, the collecting objective is in the form of a Cassegrain system with a primary mirror 10 and a secondary mirror 11, both of them movable. Change in focal length and hence magnification is effected by moving both of the mirrors in such a manner as to change the focal length without shifting the image plane.

It will be noted that in FIGS. 1 and 3 it was necessary to move two elements in the optics simultaneously in order to change focal length, and hence magnification, without changing the image plane. When the size of the actual image of a reticle is to be changed, it is always necessary to move simultaneously two elements, however, these do not have to be two elements in the optical system; the focal length of the optical system may be changed by moving only one element, for example, in FIG. 3 by moving only the secondary mirror 11 axially. However, this would change the plane in which the image falls. If the reticle, detector, mask and motor were also moved a corresponding amount axially the function of the present invention would be retained. It should be noted that there are still two elements which need to be moved simultaneously but one is the image plane and the other an element of the optics. While, theoretically, the above described modification functions just as well in practice it is less convenient to have to move the motor, detector, and reticle, than to move another element in the optical system. Therefore, when there is to be an actual change in the size of the image which requires simultaneously movement of two elements it is normally preferable to have these two elements parts of the optical system.

In the description of the operation of FIGS. 1 to 3 it has been pointed out that two elements have to be moved simultaneously and, if all adjustment is in the axial direction, this is true. However, it is possible to obtain the advantages of the present invention by moving only a single element. If the operation of the present invention is analyzed, it will be noted that the important thing is that the size of the image on the reticle is changed relative to the width of the bars, thus it is possible to produce the same effect as is produced in FIGS. 1 to 3 by leaving the optical magnification fixed and changing the relative size of the bars. This can be effected physically with double disc reticles which can be turned with respect to each other so that bars widen or narrow or any other similar mechanical structure in which the physical size of the bars change. The results of the present invention are obtained but the mechanism of changing bar width is a mechanical one and delicate adjustments may be adversely affected by backlash between the relatively moving parts. While, therefore, a physical change in bar width is included in the present invention as one of the means to obtain the relative change of image size with respect to bar width, it is normally not as desirable as effecting such a change by changing the magnification of the optical system. However, even though physically changing the size of the bars is less desirable there is a simple way of optically changing them and this will be described in connection with FIG. 4.

Figure 4:
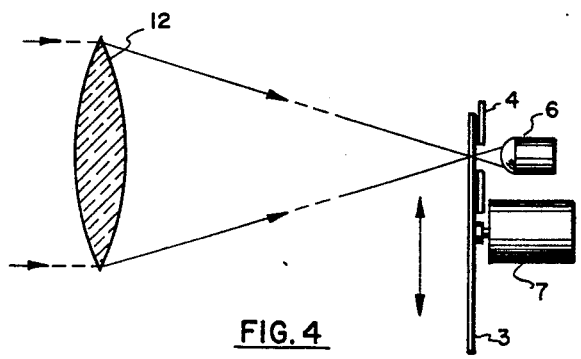
FIG. 4 is an illustration of a system in which the objective is unchanged and the reticle is moved.

In FIG. 4, where the same parts bear the same reference numerals, a fixed focus optical system is illustrated diagrammatically by a single lens 12 this images on the plane of the reticle 3 but the image is always the same size. However, the bars may be optically changed by moving the reticle and motor at right angles to the optical axis. This is indicated on the drawings by the double arrow. The bars on the reticle, which are radial, decrease in width from the periphery of the reticle to the center and so, when the reticle is displaced radially, a different part or annular zone is brought into the optical system. This has the effect of changing the width or apparent width of the bars. The change is not by physically altering the bars but by exposing different portions of them to the optical system and is, therefore, not subject to the problem of backlash where the physical size of the bars has to be micrometrically changed. It is, of course, quite simple to provide rigid and very fine adjustable movement of the reticle and motor at right angles to the optical axis and so, this method, although it does require moving larger parts, presents some practical advantages.

FIG. 4, however, also presents some disadvantages. If there is going to be a very great variation in relative size of the image as compared to bar width or more properly pattern width, then the reticle must be of rather large size because only on a large disc will there be a sufficiently great change in bar width. Within reasonable limits a fairly large reticle can be used even up to a size as large as 12 inches or more, however, there is an upper limit beyond which the reticle size becomes excessive and so, the modification of FIG. 4 is applicable only to instruments where the range of relative image size to pattern width is not too great.

In the drawings there has been illustrated systems which are catoptric and dioptric. As has been pointed out above, the details of the optical system are not changed by the present invention which merely requires that a sufficient number of components be axially adjustable so that the variation in magnification may take place in the systems where the control is entirely in the optics. The invention is, therefore, not concerned with whether the optic is catoptric or dioptric and, in fact, catadioptric systems work just as well. This is an advantage of the invention as the optics may be chosen for their efficiency in connection with the particular radiations which are to be received by the instruments and no limitation on the basic nature of the optics is, therefore, present.

In FIGS. 1 to 3 the whole change in relative image to reticle patterns size is effected in the optics. Similarly in FIG. 4 the whole of the change is effected by moving the reticle so that the size of the bars presented to the optic system is changed. These modifications present the advantage of fewer moving parts. On the other hand, where an enormous range of relative image size to bar width becomes necessary, it is possible to change both the image size and the bar size. This requires additional moving parts but where the change has to be very great, presents advantages because all optical systems which change the focal length have certain practical limits for the range of change. This is particularly true with the varifocal objectives of the dioptric type which is shown in FIG. 1. The simultaneous movement of two elements effects a balancing of aberrations, the balance reduces undesired effects quite markedly but it does not eliminate them perfectly. Therefore, ordinarily a varifocal objective is rated as being usable only over a certain range of focal length variation. Similarly in catoptric systems, there is a problem if the focal length variation is too great. The problem in some cases may be less than in the dioptric systems because the problem of chromatic aberration does not arise because mirrors are achromatic. Nevertheless, even in the catoptric systems, there are practical limits to the variation of focal length. When the requirements of the instrument of the present invention go beyond the practical limits of focal length variation of the optics, then the combination with a variation of size which is illustrated in FIG. 4 becomes desirable. Also, if the instrument has both optics variation and bar size variation, a wide range may be obtained without excessive degrees of variation in either component, in other words, a reticle of convenient size may be used in such a system. So long as there is the required change in relative size of images and reticle pattern widths, the present invention operates and the great number of possible variations by which this relative change in image size relative to pattern width may be achieved constitutes an advantage. The instrument is very versatile and modifications may be designed for a great many different uses.

While there is an advantage that the present instrument may be used alone, for example as was pointed out it may effect both acquisition and fine tracking in a tracker, it is by no means necessary that the instrument be used alone. It can be incorporated into systems which employ other types of radiation detection for other functions. The great versatility of the instrument of the present invention enables effective incorporation in a wide number of systems for the solution of a number of important problems.

We claim:
1. In a chopped radiation radiometer which comprises in combination and in optical alignment a detector, a rotatable chopper of the repetitive pattern type and collecting optics for imaging radiation on the plane of the chopper, the improvement which comprises,
 (a) an axis of rotation of the chopper parallel to the optic axis of the radiometer,
 (b) the chopper comprising a disc reticle with radial bars the width of which varies from the center to the periphery of the disc,
 (c) finely adjustable means for moving the axis of rotation of the reticle at right angles to the optic axis of the radiometer to different fixed positions whereby the relative size of image and bar pattern is changed and the radiometer may be adjusted to minimize signal from backgrounds without reducing signals from targets within its field of view small in comparison to bar size.

2. A radiometer according to claim 1 in which the optics are dioptric.

3. A radiometer according to claim 1 in which the optics are catoptric.

4. A radiometer according to claim 1 in which the collecting optics comprises imaging means of the varifocal type and means for varying the focal length thereof.

References Cited by the Examiner
UNITED STATES PATENTS

| | | | |
|---|---|---|---|
| 2,892,124 | 6/59 | Rabinow | 250—233 |
| 2,906,883 | 9/59 | Hansen | 250—203 |
| 2,917,967 | 12/59 | Steglich | 88—1 |
| 2,930,894 | 3/60 | Bozeman | 88—1 |
| 2,942,118 | 6/60 | Gedance | 88—1 |

FOREIGN PATENTS

| | | |
|---|---|---|
| 866,399 | 8/41 | France. |

JEWELL H. PEDERSEN, *Primary Examiner.*

EMIL G. ANDERSON, *Examiner.*